United States Patent [19]

Blackwood et al.

[11] Patent Number: 4,761,941
[45] Date of Patent: Aug. 9, 1988

[54] COTTON PICKER LOWER PICKER DRUM CLEANER

[76] Inventors: Leo Blackwood; Donna L. J. Blackwood, both of 6880 S. James Rd., Tranquillity, Calif. 93668

[21] Appl. No.: 66,334

[22] Filed: Jun. 25, 1987

[51] Int. Cl.[4] ............... A01D 46/16; A01D 46/08
[52] U.S. Cl. ................................. 56/36; 56/48; 56/28
[58] Field of Search ............. 56/48, 44, 40, 41, 36, 56/28

[56] References Cited

U.S. PATENT DOCUMENTS

| 1,751,389 | 3/1930 | Bledsoe, Jr. | 56/44 |
|---|---|---|---|
| 3,043,075 | 7/1962 | Hubbard | 56/40 |
| 3,066,466 | 12/1962 | Hubbard | 56/41 |
| 3,170,277 | 2/1965 | Hubbard | 56/44 |
| 3,359,711 | 12/1967 | Hubbard | 56/44 |
| 3,451,201 | 6/1969 | Grichnik | 56/44 |

FOREIGN PATENT DOCUMENTS 925266 5/1982 U.S.S.R. ................... 56/48

Primary Examiner—Paul J. Hirsch
Assistant Examiner—Vincent Ciamacco
Attorney, Agent, or Firm—Fleit, Jacobson, Cohn & Price

[57] ABSTRACT

A cleaner accessory is provided for mounting from the lower base plate of a picker drum of a cotton picker, and the accessory includes a depending tang spaced slightly outward of the outer periphery of the picker drum base plate and projecting slightly downwardly therebelow. The tang projects only slightly outward of the outer periphery of the picker drum base plate an amount less than the spacing between the picker drum base plate outer periphery and a stationary upstanding flange of the cotton picker, and the accessory further includes an upward extension thereof projecting appreciably above the picker drum base plate and equipped with a partial cylindrical guard positioned immediately foward of, in the direction of rotation of the drum, the lower end of one of the picker bars pivotally supported from the periphery of the picker drum base plate.

7 Claims, 1 Drawing Sheet

4,761,941

COTTON PICKER LOWER PICKER DRUM CLEANER

BACKGROUND OF THE INVENTION

1. Field of the Invention

The lower base plates of vertically disposed picker drums of cotton pickers experience considerable wear and abrasion due to accumulation of dirt between the lower base plates and the horizontal frame portions of the typical cotton picker disposed therebeneath. In addition, most cotton pickers include an upstanding flange projecting upwardly from the horizontal frame portion spaced slightly outward of the base plate of a picker drum, and dirt accumulates between the outer periphery of the drum base plate and the aforementioned flange.

This accumulation of dirt tends to abrade away the lower base plate of the rotary picker drum, and in many instances the drum must be replaced after approximately three seasons. In addition, the accumulation of dirt between the aforementioned flange and the drum base plate also tends to abrade away the lower ends of picker bars supported from the drum.

This unnecessary abrading away of the picker drum lower base plate and the picker bars represents a considerable operating expense to the cotton harvester. Accordingly, there is a need for a structure by which the aforementioned accumulation of dirt may be avoided.

2. Description of Related Art

Various different forms of cleaning devices and other mechanisms including some of the general structure and operational features of the instant invention are disclosed in U.S. Pat. Nos. 1,828,534; 3,043,075; 3,359,711; and 3,402,538. However, these previously known structures do not perform the specific intended function of the instant invention.

SUMMARY OF THE INVENTION

The cleaner of the instant invention is designed to be mounted upon one peripheral portion on the lower base plate of an upstanding picker drum of a cotton picker and incorporates a horizontal mounting plate portion for overlying and securement to the upper surface of the picker drum base plate adjacent one peripheral portion thereof. The cleaner also incorporates a depending tang projecting downwardly from the mounting plate portion outward of the drum base plate periphery and terminating downwardly a spaced distance below the drum base plate, but spaced above the horizontal frame portion of the cotton picker spaced below picker drum. In addition, the tang, although projecting slightly outward of the picker drum base plate, projects only slightly outward therefrom so as to be receivable inward of an upstanding stationary flange portion carried by the frame of the cotton picker and spaced outward of the outer periphery of the drum base plate.

The main object of this invention is to provide an attachment for the lower end of a picker drum of a cotton picker for the purpose of preventing the accumulation of dirt between the picker drum lower end plate and the underlying horizontal picker frame portion and also between the outer periphery of the picker drum base plate and a stationary upstanding flange of the picker drum frame spaced slightly outward of the picker drum base plate.

Another object of this invention, in accordance with the immediately preceding object, is to provide an attachment which may be readily mounted from each picker drum of a cotton picker.

A further object of this invention is to provide an attachment which may be mounted from a picker drum independent of modifications to the picker drum itself.

Still another important object of this invention is to provide an attachment in accordance with the preceding objects that will greatly lengthen the life expectancy of a picker drum base plate and the lower ends of picker bars supported from the picker drum.

A further object of this invention is to provide an attachment which may be easily modified during construction for use on picker drums of different manufacture.

A final object of this invention to be specifically enumerated herein is to provide a picker drum cleaner in accordance with the preceding objects and which will conform to conventional forms of manufacture, be of simple construction, and easy-to-use so as to provide a device that will be economically feasible, long-lasting, and relative trouble-free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
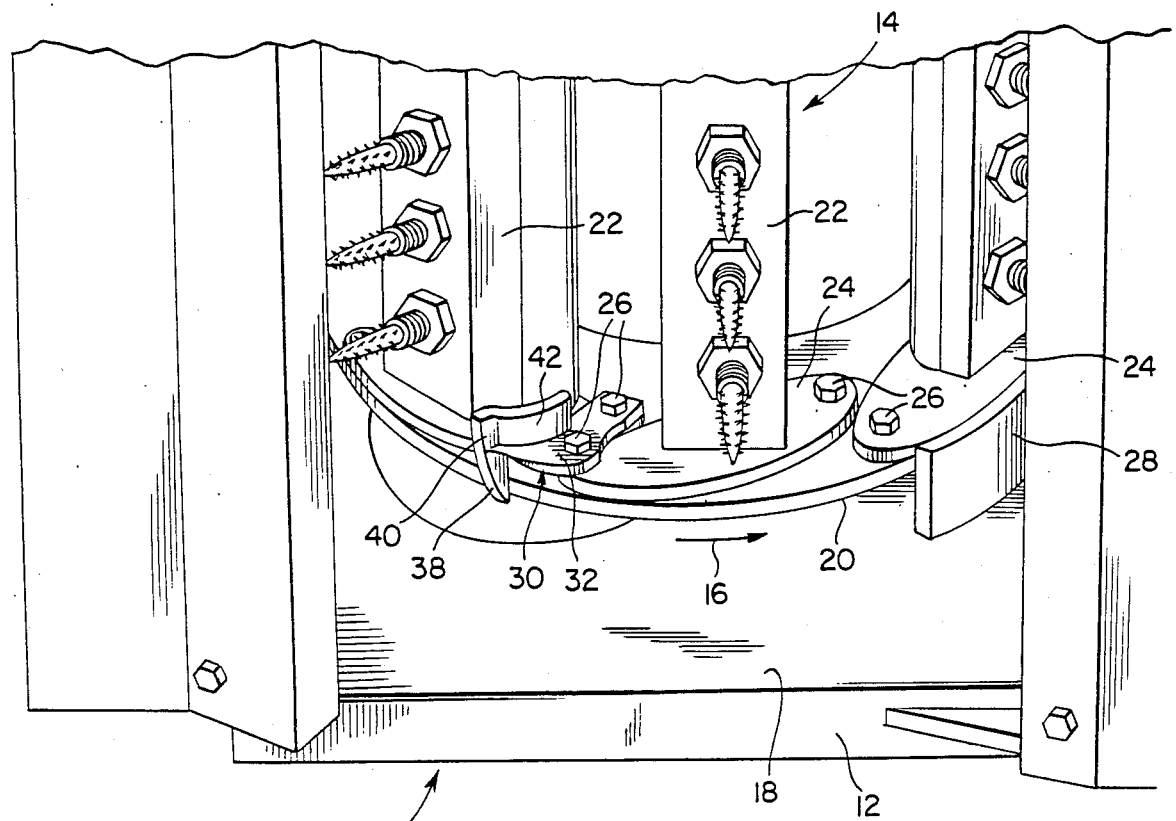
FIG. 1 is a fragmentary perspective view of the lower end portion of a typical form of picker drum and the adjacent components of the associated cotton picker, the cleaner of the instant invention being mounted on one peripheral portion of the base plate of the picker drum.
Figure 2:
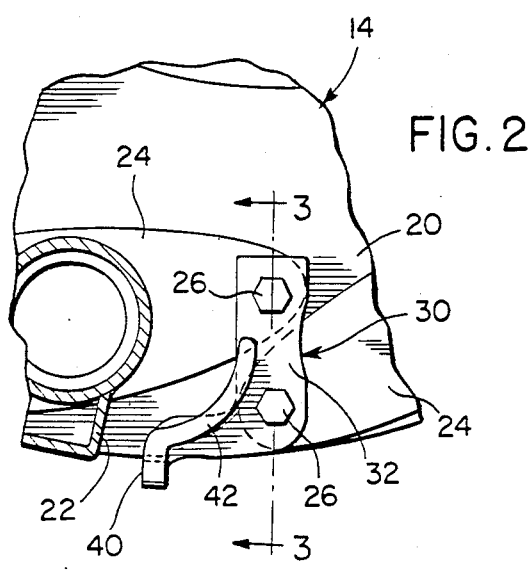
FIG. 2 is a fragmentary horizontal sectional view of that portion of the picker drum from which the attachment is supported.
Figure 3:
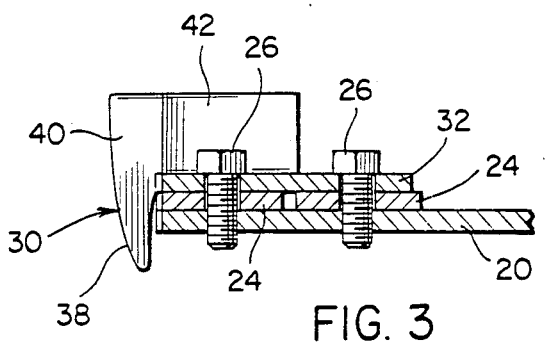
FIG. 3 is an enlarged fragmentary vertical sectional view taken substantially upon the plane indicated by the section line 3—3 of FIG. 2.
Figure 4:
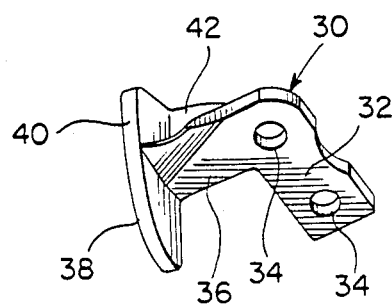
FIG. 4 is a perspective view of the cleaner.

Referring now more specifically to the drawings, the numeral 10 generally designates a typical form of cotton picker, such as a John Deere cotton picker of the 9900 series, including a frame 12 from which a picker drum, referred to in general by the reference numeral 14, is journalled for rotation in the direction indicated by the arrow 16. Drum 14 is journalled from a horizontal portion 18 of the frame 12 and includes a lower generally circular base plate 20 from which the lower ends of a plurality of picker bars 22 are pivotally supported through the utilization of pivot studs (not shown) mounted from support plates 24 overlying and secured to the base plate 20 through the utilization of pairs of fasteners 26. The horizontal portion 18 additionally includes an upstanding frame flange 28 spaced radially outward of the outer periphery of the base plate 20. In addition, the base plate 20 is spaced above the horizontal portion 18.

During operation of the cotton picker 10, depending upon the height of the drum 14 relative to the ground and the moisture content of the ground, dirt has a tendency to accumulate between the base plate 20 and the horizontal portion 18 and between the outer periphery of the base plate 20 and the frame flange 28. These accumulations of dirt can abrade the base plate and the picker bars 22 to the extent that replacement is required after approximately three seasons. These replacements constitute a considerable expense, particularly in view of the number of picker bars 22 utilized on the cotton picker 10.

The cleaner of the instant invention is referred to in general by the reference numeral 30 and includes a horizontal mounting flange portion 32 apertured as at 34 and including a lateral extension 36 from which a depending tang 38 is supported. In order to install the cleaner 30, a pair of adjacent fasteners 26 for adjacent support plates 24 are removed, and the mounting flange portion 32 is disposed over and mounted to the adjacent support plates 24 through the utilization of the fasteners 26 as a result of the latter being resecured through the apertures 34. The tang 38 is disposed slightly outward of the outer periphery of the base plate 20 and includes an upper portion 40 which projects above mounting flange portion 32 and includes an integral partial cylindrical shield portion 42 disposed immediately forward of one of the picker bars 22 in the direction of rotation of the drum 14.

The tang 38, including the upper portion 40 thereof, projects outward of the base plate 20, but slightly less than the distance the frame flange 28 is spaced outward of the picker drum base plate periphery. Accordingly, the tang 38 passes immediately inward of the frame flange 38.

Any dirt tending to build up upon the horizontal portion 18 and move thereacross to a position beneath the base plate 20 is contacted and swept away by the tang 38, and any dirt tending to build up between the outer periphery of the base plate 20 and the frame flange 28 also is contacted and swept away by the tang 38. Further, the shield portion 32 also tends to contact and sweep away large clumps of dirt which may be deposited between the frame flange 28 and the rotating picker bars 22.

By utilization of the cleaner 30, the lower ends of the picker bars 22 are protected against abrasion from an accumulation of dirt, and the base plate 20 is protected from an accumulation of dirt therebeneath.

It is pointed out that each drum 14 need be equipped with only one of the cleaners 30. Further, the cleaners 30 may be manufactured at a low cost and may be attached to a corresponding picker drum 14 within approximately two minutes if manual tools are used, and in a considerable shorter period of time if power tools are used.

The foregoing is considered as illustrative only of the principles of the invention. Further, since numerous modifications and changes will readily occur to those skilled in the art, it is not desired to limit the invention to the exact construction and operation shown and described; and, accordingly, all suitable modifications and equivalents may be resorted to, falling within the scope of the invention.

What is claimed as new is as follows:

1. In combination with a cotton picker of the type including a frame relative to which a picker drum is journalled for rotation about an upstanding axis and wherein said drum includes a lower base plate spaced above a horizontal portion of said frame and a plurality of peripherally spaced, upstanding picker bars having lower ends pivotally supported from peripherally spaced portions of said base plate, a cleaner accessory, said cleaner accessory including a horizontal plate mounting portion disposed over and anchored relative to a selected peripheral portion of said base plate and a depending tang portion supported from said plate mounting portion and extending downwardly therefrom outward of said peripheral portion and to a level spaced slightly below said base plate and above said frame horizontal portion.

2. The cotton picker of claim 1, wherein said horizontal portion of said frame includes a stationary, upstanding frame flange spaced slightly outward of one side of said base plate, said tang portion projecting outward of said peripheral portion of said base plate a distance at least slightly less than the radial spacing of said flange outward of said peripheral portion.

3. The cotton picker of claim 1, wherein each of said upstanding picker bar lower ends is pivotally supported from said base plate through the utilization of a pivot stud equipped mounting plate including remote portions anchored in overlying relation to said base plate through the utilization of fasteners secured downwardly through said mounting plate and relative to said base plate, said fasteners also being downwardly secured through said plate mounting portion.

4. The cotton picker of claim 3, wherein said horizontal portion of said frame includes a stationary, upstanding frame flange spaced slightly outward of one side of said base plate, said tang portion projecting outward of said peripheral portion of said base plate a distance at least slightly less than the radial spacing of said flange outward of said peripheral portion.

5. The cotton picker of claim 1, wherein said accessory includes an upward extension of said tang projecting above said plate mounting portion, said extension including a partial cylindrical portion disposed over said base plate and projecting upwardly therefrom immediately in advance of one of said picker bars in the direction of rotation of said drum.

6. The cotton picker of claim 5, wherein said horizontal portion of said frame includes a stationary, upstanding frame flange spaced slightly outward of one side of said base plate, said tang portion projecting outward of said peripheral portion of said base plate a distance at least slightly less than the radial spacing of said flange outward of said peripheral portion.

7. The cotton picker of claim 5, wherein each of said upstanding picker bar lower ends is pivotally supported from said base plate through the utilization of a pivot stud equipped mounting plate including remote portions anchored in overlying relation to said base plate through the utilization of fasteners secured downwardly through said mounting plate and relative to said base plate, said fasteners also being downwardly secured through said plate mounting portion.

* * * * *